SUPERCONDUCTIVE STORAGE CIRCUITS

Original Filed Feb. 18, 1964 4 Sheets-Sheet 1

INVENTOR
NORMAN D. RICHARDS
BY Frank R. Trifari
AGENT

INVENTOR
NORMAN D. RICHARDS
BY
Frank R. Trifari
AGENT

SUPERCONDUCTIVE STORAGE CIRCUITS

Original Filed Feb. 18, 1964 4 Sheets-Sheet 3

INVENTOR
NORMAN D. RICHARDS
BY Frank R. Trifari
AGENT

SUPERCONDUCTIVE STORAGE CIRCUITS

Original Filed Feb. 18, 1964 4 Sheets-Sheet 4

INVENTOR
NORMAN D. RICHARDS

BY

Frank R. Trifari
AGENT

United States Patent Office

Re. 26,702
Reissued Nov. 4, 1969

26,702

SUPERCONDUCTIVE STORAGE CIRCUITS

Norman Dennis Richards, Tilgate, Crawley, Sussex, England, assignor to U.S. Philips Corporation, New York, N.Y., a corporation of Delaware Original No. 3,362,018, dated Jan. 2, 1968, Ser. No. 345,700, Feb. 18, 1964. Application for reissue Oct. 2, 1968, Ser. No. 769,455

Int. Cl. G11b *9/00;* H03k *17/00*

U.S. Cl. 340—173.1 16 Claims

Matter enclosed in heavy brackets [ ] appears in the original patent but forms no part of this reissue specification; matter printed in italics indicates the additions made by reissue.

*ABSTRACT OF THE DISCLOSURE*

*The invention is a superconductive storage matrix which uses a group of series connected superconductive storage elements and a pair of superconductive devices connected across the elements and bistably switched between a normal characteristic impedance and zero impedance in response to a corresponding pair of input signals. A proper selection of the input signals to the superconductive devices determines whether the information associated with the matrix is to be stored or read out.*

This invention relates to electric circuits employing superconducting elements such as cryotrons.

Such a circuit may form part of a computer using superconductive elements as the storage elements.

By combining the advantages of compactness and relatively simple construction of a superconductive storage matrix with the flexibility and speed of operation of external amplifiers and driving circuits, a relatively compact and economical computer may be designed.

Irrespective of the manner of organization of the store, means must be provided to specify the store address and to set the individual bits in the word. Also, amplifiers must be provided for the output of the store. With a superconductive storage matrix it is essential to provide cooling apparatus at an irreducible minimum cost and so it is little more expensive to provide a very large store of say $10^6$ bits than a small store.

There are basically two types of superconductive current stores. The first of these types is typlified by the Crowe cell or the R.C.A. continuous sheet store which operates on a coincident current mode and stores information by means of induced persistent currents. The second type operates on a word address mode and relies on the logical switching properties of cryotrons to store a current that is defined by an external circuit and is typified by the store described by Haynes of IBM in Solid State Electronics 1 (1960), page 399.

It is an object of the present invention to provide an electric circuit for a computer using superconductive storage elements in which the signal to noise ratio can be substantially improved.

According to one aspect of the present invention there is provided an electric circuit including a plurality of superconductive storage elements connected in series between a first point and a second point; a first superconductive device is connected between a first terminal and a second terminal and is arranged to be switched in a bistable manner, between a condition of zero impedance and a condition of normal characteristic impedance, in dependence upon a first input signal which is arranged to be applied to the superconductive device. The first terminal is connected to said first point of the series connected superconductive storage elements and the second terminal is connected to said second point of the series connected storage elements.

According to another aspect of the invention, the circuit may include a third and a fourth terminal between which is connected a second superconductive device which is arranged to be switched in a bistable manner between a normal characteristic impedance and zero impedance, in dependence upon a second input signal which is arranged to be applied to the second superconductive device, said third terminal being connected to said second point and said fourth terminal being connected to said second terminal.

One embodiment of the invention will now be described, by way of example, with reference to the accompanying drawings in which:

FIGURE 1 shows the symbol for a storage element;

FIGURE 2 shown a plurality of such storage elements connected according to the invention;

Figure 1:
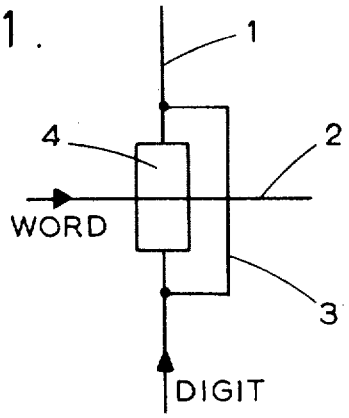

Referring now to the drawings, FIGURE 1 represents a storage element of the type described in my co-pending U.S.A. patent application Ser. No. 345,699 filed Feb. 18, 1964 for Superconductive Devices. Essentially the storage element comprises a gate conductor 1 composed preferably of tin, crossed at right angles by a control conductor 2 composed preferably of lead. A loop 3, also preferably of lead, is connected to the gate conductor 1 on both sides of the switched region 4. The loop 3 is uninfluenced by current flowing in the control conductor 2 and remains superconductive. The control conductor 2 is insulated from the gate conductor 1 and the loop 3 by a thin insulating layer preferably of silicon monoxide.

Assume that the device is cooled sufficiently so that the conductors are superconductive and a current is caused to flow in the gate conductor 1; then if a current is applied to the control conductor 2 so as to cause the region 4 to become normally conductive, the current originally flowing in the gate conductor 1 will be diverted into the superconductive loop 3. If now the current in the control conductor 2 is removed, thus causing the region 4 to become superconductive again, and the current in the gate conductor 1 is also removed, this may be considered as applying an equal but opposite current to the gate conductor 1, and a circulating current will be set up through the loop 3 and superconductive region 4 of the gate conductor 1. This circulating current is equal in magnitude to the original current in the gate conductor 1. The current will continue to circulate around the loop and its magnitude will be unaffected providing the path through which it travels remains superconductive. This arrangement is therefore an analogue storage element provided that the critical current for any of the materials of the element is not exceeded by the storage current. It will be appreciated that the current may circulate in either direction dependent upon the direction of the original current in the gate conductor 1.

The stored current may be sensed by applying a current to the control conductor 2 so as to switch the region 4 into the normally conductive state and sensing the voltage drop across the region 4. This is a form of destructive read out since once the region 4 is normally conductive, therefore possessing predetermined resistance, the current in the loop will decay to zero.

Figure 2:
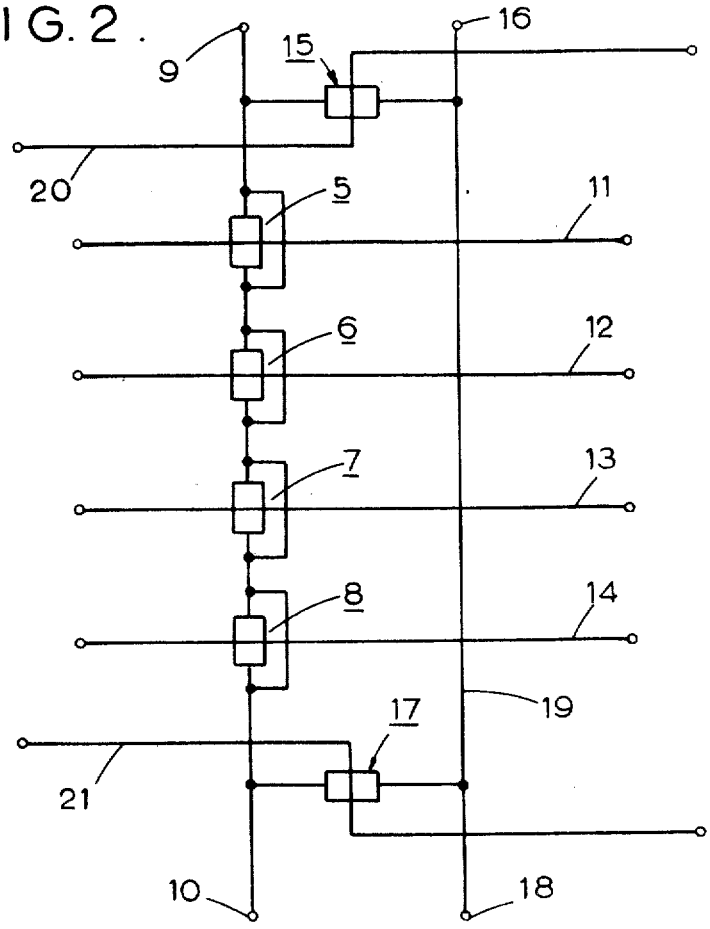

Referring now to FIGURE 2 which shows four storage elements, 5, 6, 7, and 8 connected in series between terminals 9 and 10. The storage elements 5, 6, 7 and 8 are traversed by control conductors 11, 12, 13 and 14 respectively. A cryotron device 15, which may be an "in line" cryotron or a multiple crossing crossed firm cryotron, has its gate conductor connected between the terminal 9 and a terminal 16. As similar cryotron device 17 has its gate conductor connected between the terminal 10 and a terminal 18, which is directly connected by way of the conductor 19 to the conductor 16. The cryotron devices 15 and 17 are controlled by currents in control conductors 20 and 21 respectively.

In operation, when a current is required to be stored in one of the elements, say the storage element 6, a current is applied to the control conductors 12 and 21, and the storage current is applied to the terminal 10. The storage current passes through the storage elements 8 and 7, then as the gate of the storage element 6 is normally conductive, the storage current flows through the superconductive by-pass loop of the storage element 6 and then through the storage element 5. As the cryotron device 15 is in the superconductive state, the storage current will return to the terminal 18 via the device 15 and the conductor 19. The conductor 19 may be ground, a ground plane, or a conductor laid down by vapour deposition using a conventional mask. As the cryotron device 15 effectively short circuits the terminals 9 and 16, no output will appear across these terminals.

In a computer, there will generally be considerably more than four storage elements in each line and the time of transmission of pulses, the matching of the line and ways of obtaining maximum power output from the line will have to be considered. When there is an input across the terminals 10 and 18 the cryotron device 15 is superconductive and the cryotron device 17 is normally conductive. Preferably the device 17, when normally conductive, has an impedance equal to the impedance of the line.

During read out of the current stored in the element 6, the device 17 is superconductive and a current is applied to the control conductor 20 so as to switch the gate normal and apply the characteristic impedance of the line between the terminals 9 and 16. A current is then applied to the control conductor 12 to switch the gate conductor of the element 6 normal. The storage current circulating in the element 6 will then decay and can be detected across the output terminals 9 and 16.

Figure 3:
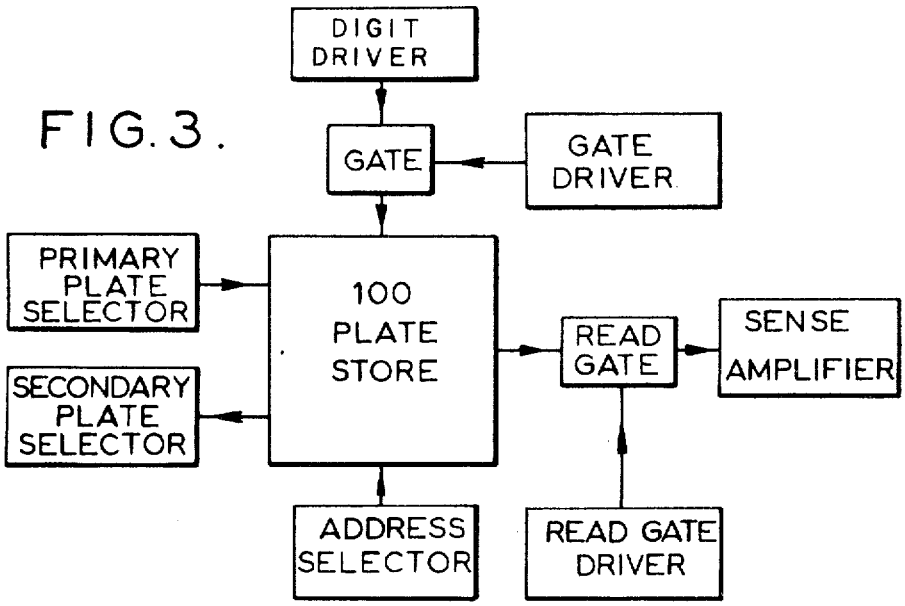
FIGURE 3 shows the drive arrangements and sense arrangement for a superconductive store.

FIGURE 3 shows the general organisation of a 25,600 word and 1.28 megabit store, with an access time of approximately 3 $\mu$seconds and a cycle time of about 10 $\mu$seconds.

Figure 5:
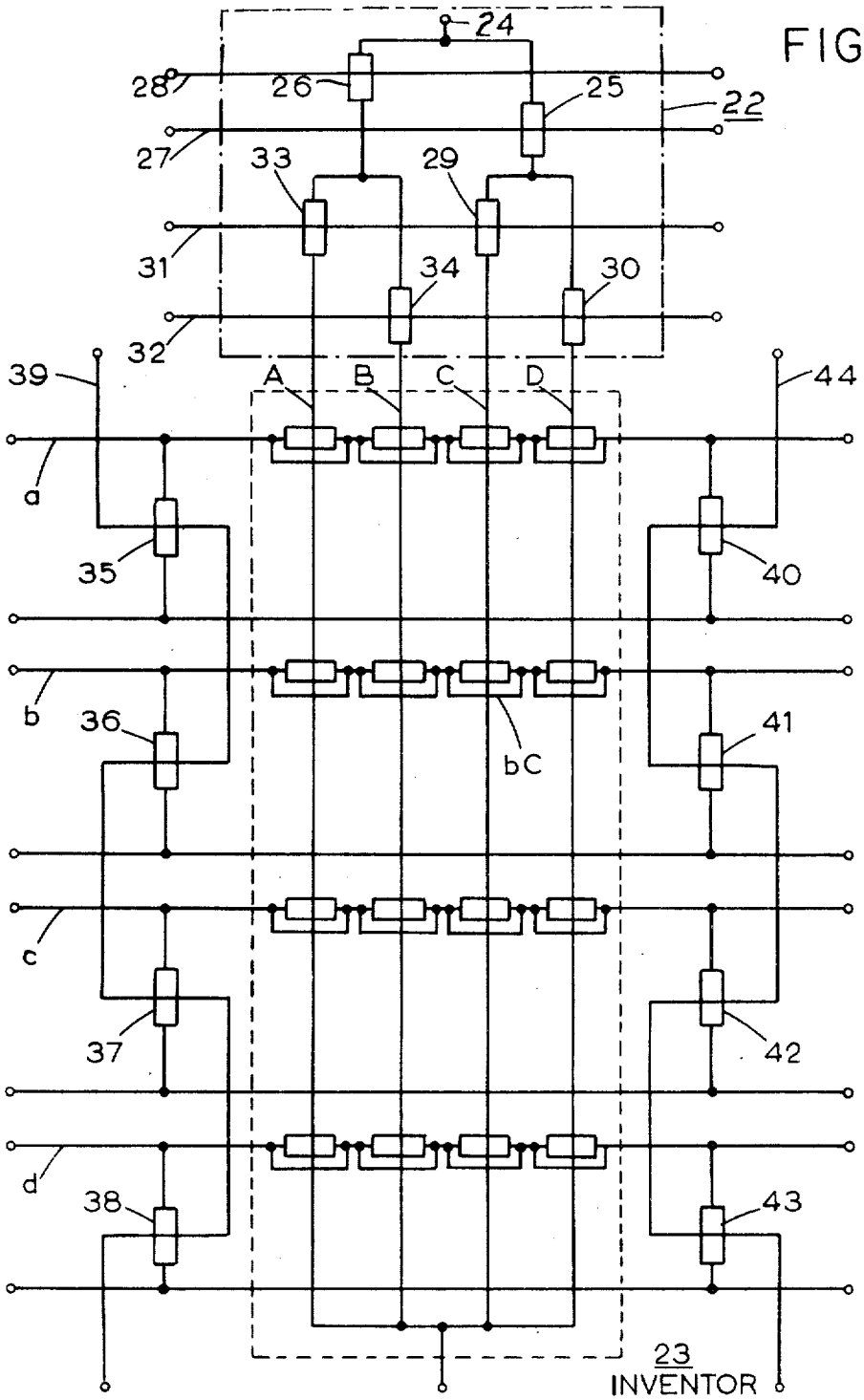
FIGURE 5 shows a 16 bit superconductive store and a superconductive address selection tree.

Reference is now made to FIGURE 5 which shows a storage plate containing only 16 storage elements whereas a plate containing 1,280 bits is required for the computer shown in FIGURE 3. The circuit of FIGURE 5 generally comprises an address selection section 22 and a storage matrix section 23.

The address selection section 22 comprises a number of crossed film cryotrons connected in a known manner in the form of a selection tree. An input terminal 24 is connected to the gate conductors of cryotrons 25 and 26 which are driven from control conductors 27 and 28 respectively. The output from the gate of the cryotrons 25 is connected to the gate conductors of cryotrons 29 and 30 which are driven from control conductors 31 and 32 respectively. The output from the gate of the cryotron 26 is connected to the gate conductors of cryotrons 33 and 34 which are driven from the control conductors 31 and 32 respectively.

The storage matrix section 23 comprises 16 storage elements which are referenced on a co-ordinate system. The four rows are referenced a, b, c and d and the four columns referenced A, B, C and D so that a storage element in the second row and third column is referenced bC.

Input cryotrons 35, 36, 37 and 38 are connected across the inputs to the rows a, b, c and d respectively and the input cryotrons 35, 36, 37 and 38 are driven from a common control conductor 39. Output cryotrons 40, 41, 42 and 43 are connected across the output of the rows a, b, c and d respectively and are driven from a common control conductor 44.

Figure 6:
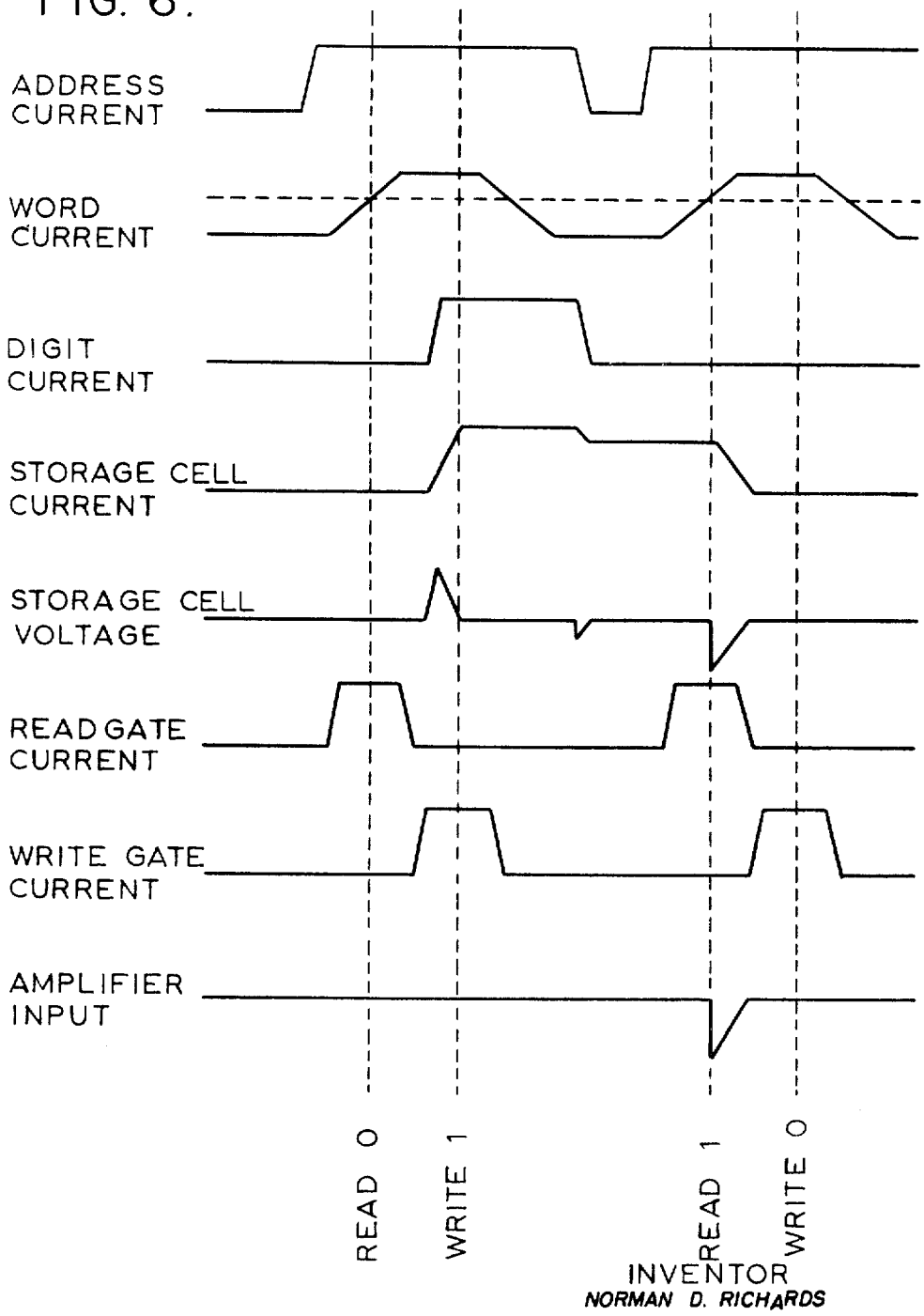
FIGURE 6 shows the pulse sequence for storage and sensing.

Referring now to FIGURES 5 and 6, if it is required to write the digit "1" in the element bC then the output cryotrons 40, 41, 42 and 43 are superconductive and hence short the output, the address current is applied to the control conductors 28 and 32.

The address current renders the cryotrons 26 and 30 and 34 normally conductive and so leaves the superconductive paths from the terminal 24 through the cryotrons 25 and 29 to the column C. The normally conductive cryotrons 26, 30 and 34 prevent current from passing down the conductors A, B and D. The write gate current is applied to the control conductor 39 so rendering the input cryotrons 35, 36, 37 and 38 normally conductive, the word current is applied to the row b and the digit current is applied to the terminal 24. A persistent current is thereby set up in the storage element bC.

To sense the current set up in the storage element bC the same address cryotrons are selected as above, the output cryotron 41 is rendered resistive by the read gate current applied to the control conductor 44 and the input cryotron 36 is superconductive as no current is applied to the control conductor 39. The word current applied to the terminal 24 switches the gate of the storage element bC.

To sense the current set up in the storage element *b*C the same address cryotrons are selected as above, the output cryotron 41 is rendered resistive by the read gate current applied to the control conductor 44 and the input cryotron 36 is superconductive as no current is applied to the control conductor 39. The word current applied to the terminal 24 switches the gate of the storage element bC from the superconductive state to the resistive state and so the storage cell current causes a voltage drop across the gate. This voltage will only be a transient voltage as the current will decay with a time constant determined by the L/R ratio of the loop. The voltage across the gate of the element bC is detected by an external amplifier connected to the digit conductor. Because the digit conductors are common to the reading and writing circuits, the input cryotrons serve to isolate the writing circuits during reading and the output cryotrons are controlled to isolate the sense amplifiers during writing. The impedance of the input and output cryotrons when they are switched to the normally conductive state, are arranged to be equal to the characteristic impedance of the storage line.

Considering the following basic cryotron parameters:

Tin gates $0.5\mu$ thick and operated at 3.4° K.
Average conductor/ground plane spacing$=1\mu$
Conductor inductance $1.2\times10^{-12}$ H per square
Gate resistivity, $R_{[}=4$ per square
Gate external critical field, $H_{ext}=50$ A./cm.
Gate internal critical field, $H_{int}=27.5$ A./cm.
Efficiency $E=H_{ext}/H_{int}=0.55$ then if the external critical current in the word conductor to drive the tin normally conductive is $i_c$ amps, and the crossing ratio of the control and gate conductor is X, then the critical current in the gate is given by $i_cXE$ which is the maximum current $i_s$ which may be stored in the loop.

The resistance of the gate in the normal state is $R_L$ where $R_L=Ra/X$.

The peak voltage across the gate on being switched to the normally conductive state is:

$$i_sR_c=\frac{i_cXERa}{X}$$
$$=i_cERa$$

It will be appreciated that to allow for tolerances the actual current stored in the gate will be reduced by a suitable factor, say 30%, and the word current would be increased by a similar proportion.

With a width of control conductor 100$\mu$ then $i_c=0.5$ amp $$\text{and the output voltage}=0.7\times0.5\times2\times10^{-3}=0.7\text{ mv.}$$

For an integrating amplifier i.e. if the pulse is short compared with the amplifier risetime the important parameter is $\int Vdt=L_c i_c$ where $L_c$=inductance of the storage element It is thus advantageous to make $L_c$ as high as possible provided that $L_c/R_c$ is not so long as to limit the cycle time.

Figure 4:
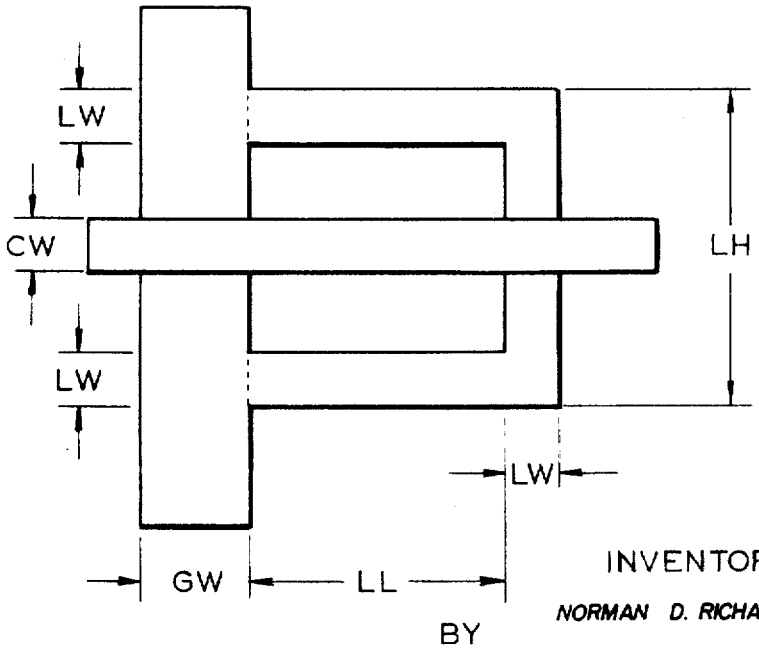
FIGURE 4 shows the relative dimensions of the conductors of a storage element.

Referring now also to FIGURE 4 which shows the form of layout of a suitable storage element the width GW of the gate conductor is 200$\mu$, the width LW of the loop conductor is 100$\mu$ and the width CW of the control conductor is 100$\mu$. The length LL of one side of the loop is 500$\mu$ and the length LH of the adjacent side of the loop is 500$\mu$. For a storage element as shown in FIGURE 4 with the above dimensions then:

$$\text{Loop inductance}=20\times1.2\times10^{-12}\text{ H}$$

$$\text{Gate resistance}=2\times10^{-3}\text{ ohms}$$

$$L_c/R_c=12\times10^{-9}\text{ secs.}$$

If the cell inductance is increased by providing a hole in the ground plane, as described in my above referred to co-pending patent application, the inductance may be increased by about 100 times and so $L_c/R_c$ ratios of up to one $\mu$second can be obtained.

$$\text{The digit current required}=I_d=0.7\times0.02\times27=0.38\text{ amp}$$

and the word current required $=I_w=0.7$ amp.

The selection of word conductors and bits has been described with reference to FIGURES 5 and 6, however, considering the case of 256 words per plate and each word containing 50 bits, if the bits are spaced at 1 mm. intervals along the word conductor the inductance of the word is $L_w$ where $$L_w=50\times10\times1.2\times10^{-12}\text{H}=6\times10^{-10}\text{H}$$

If crossed film cryotrons are used in the address selection section, the crossing ratio of each cryotron is unity.

$$\text{If } E=0.55 \text{ then the address currents}=\frac{1}{E}I_w$$

Calculated minimum address current=0.7/0.55=1.3 amps.

However, to allow for tolerances, a factor of two should be included so that the address circuit $I_a$=2.6 amps. As the address cryotrons are connected in the form of a tree which has the effect of decreasing the impedance for a 256 way switch, the effective resistance is about $R_a/10$=0.4 mohms. The time for the current to reach equilibrium is about 2L/R and therefore the switching time for an external current pulse $$=\frac{2\times6\times10^{-10}}{0.4\times10^{-3}}=3\mu\text{ secs.}$$

The output circuit for each bit consists of the tin gate conductor which is wired in series from plate to plate. For the minimum read out delay and minimum pulse distortion the transmission line that this conductor forms should be terminated in its characteristic impedance $Z_o$. The line is not of constant impedance but has the plate sections, which are of low impedance, in series with the interconnections between plates, which will be of high impedance. The effect of the high impedance interconnections will be to raise the average impedance of the line and increase the delay. It will also produce a low pass filter network with a given cut-off frequency.

The evaporated conductor will have an inductance per unit length equal to that of an air spaced line of $Z_o=377/200=1.88\Omega$.

The interconnection between plates has an inductance per unit length equal to that of line of $Z_o=100\Omega$. The length of the interconnection will only be about 2 mm. compared with 10 cm. of line on the plate and so the additional inductance due to plate interconnections will be about equal to the plate line inductance. This will raise the impedance of the composite line to 1.4 times its original value and increase the delay by the same factor. The cut off frequency of the composite line will be high enough to be neglected.

The total delay down such a line depends upon its length and the velocity of propagation of pulses along the line. If the dielectric constant of the silicon monoxide is 8 and the additional lumped inductance is equal to the distributed inductance the velocity along the line will be 0.25 that in free space. The length of line for 100 plates would be 100 x 10 cm. i.e. 10 metres. Thus the delay in the sense line would be $4\times3.3\times10=130$ msec.

The $Z_o$ of the line would be about 0.9$\Omega$.

The line is terminated by a cryotron having a normal resistance equal to 900 m$\Omega$. As previously described this may be switched so as to short circuit the read amplifier except during the read period. The length to width ratio r of this cryotron depends upon Ra. If Ra is 4 m$\Omega$ then $$r=900/4=225$$

$$\text{Cryotron length}=0.2\text{ x }225=4.5\text{ cm.}$$

(The voltage $V_d$ across the terminating resistor when in the superconduction state will be $$L_T\frac{di_d}{dt})$$

The inductance of such a cryotron would be $$L_T=225\times1.2\times10^{-12}=2.7\times10^{-10}\text{H}$$

If the rise time of the digit current is 0.1/$\mu$second and its magnitude is 400 ma. then $di_d/dt=0.4\times10^7$.

$$V_d=0.4\times10^7\times2.7\times10^{-10}=1.1\text{ mv.}$$

As this is little greater than the sense output it may easily be rejected by a time strobe. If the sense amplifier is effectively an integrating amplifier it is more useful to consider the ratio of the product Li for the switched storage element and the digit current interference. As the current is the same in both cases, the ratio is simply the ratio of inductances. For the storage element without holes in the ground plane the integrated interference voltage would be about 10 times greater than the integrated storage element voltage, but for the storage element with a hole in the ground plane the integrated interference voltage would be about 10 times less than the integrated signal voltage. The far end of the line can either be permanently terminated with a suitable resistance, or preferably, it is terminated by a similar cyrotron which is controlled by the complement of the first cyrotron control current.

While the invention has been described with respect to specific embodiments, it is susceptible to modifications and variations by those skilled in the art without departing from the inventive concept as set forth in the claims.

What I claim is:

1. A superconductive storage circuit comprising: a plurality of superconductive storage elements connected in series between a first point and a second point, a first superconductive device connected between a first terminal and a second terminal, means for applying a first input signal to said first superconductive device, said first input signal acting to switch said first superconductive device in a bistable manner between a condition of zero impedance and the condition of normal characteristic impedance, said first terminal being connected to said first point and said second terminal being connected to said second point of the series connected storage elements.

2. *A superconductive storage circuit comprising: a plurality of superconductive storage elements connected in series between a first point and a second point, a first superconductive device connected between a first terminal and a second terminal, means for applying a first input signal to said first superconductive device, said first input signal acting to switch said first superconductive device in a bistable manner between a condition of zero impedance and the condition of normal characteristic impedance, said first terminal being connected to said first point of the series connected storage elements* [An electric circuit as claimed in claim 1, further including] a third terminal and a fourth terminal, a second superconductive device connected between said third and fourth terminals, means for applying a second input signal to said second superconductive device, said second input signal acting to switch said second superconductive device in a bistable manner between a condition of zero impedance and a condition or normal characteristic impedance, said third terminal being connected to said second point and said fourth terminal being connected to said second terminal.

3. An electric circuit including a plurality of superconductive storage elements connecting in series between a first point and a second point, a superconductive device connected between a first terminal and a second terminal, means for applying an input signal to said device, said input signal acting to switch said device in a bistable manner between a condition of zero impedance and a condition or normal characteristic impedance, said first terminal being connected to said first point of the series connected superconductive storage elements and said second terminal being connected to said second point of the series connected storage elements, said superconductive storage elements and said superconductive device being constructed of thin films on a substrate which supports a thin superconductive ground plane, said second terminal being connected to said superconductive ground plane.

4. An electric circuit including a plurality of superconductive storage elements connected in series between a first point and a second point, a first superconductive device connected between a first terminal and a second terminal, means for applying a first input signal to said first superconductive device, said first input signal acting to switch said first device in a bistable manner between a condition of zero impedance and a condition of normal characteristic impedance, a second superconductive device connected between a third terminal and a fourth terminal, means for applying a second input signal to said second superconductive device, said second input signal acting to switch said second device in a bistable manner between a condition of zero impedance and a condition of normal characteristic impedance, said first terminal being connected to said first point, [said second terminal and] said third terminal being connected to said second point, and said fourth terminal being connected to said second terminal, said superconductive storage elements and said first superconductive device being constructed of thin films on a substrate which supports a thin superconductive ground plane, said second terminal being connected to said superconductive ground plane.

5. An electric circuit including a plurality of superconductive storage elements connected in series between a first point and a second point, a first superconductive device connected between a first terminal and a second terminal, means for applying a first input signal to said first superconductive device, said first input signal acting to switch said first device in a bistable manner between a condition of zero impedance and a condition of normal characteristic impedance, a second superconductve device connected between a third terminal and a fourth terminal, means for applying a second input signal to said second superconductive device, said second input signal acting to switch said second device in a bistable manner between a condition of zero impedance and a condition of normal characteristic impedance, said first terminal being connected to said first point, [said second terminal and] said third terminal being connected to said second point, and said fourth terminal being connected to said second terminal, said superconductive storage elements and said first and second superconductive devices being constructed of thin films on a substrate which supports a thin superconductive ground plane, said second terminal being connected to the thin superconductive ground plane of said first superconductive device, said fourth terminal being connected to the thin superconductive ground plane of said second superconductive device.

6. In a storage matrix of a computer, the combination comprising: an electric circuit including a plurality of superconductive storage elements connected in series between a first point and a second point, a superconductive device connected between a first terminal and a second terminal, means for applying an input signal to said device, said input signal acting to switch said device in a bistable manner between a condition of zero impedance and a condition of normal characteristic impedance, said first terminal being connected to said first point of the series connected superconductive storage elements and said second terminal being connected to said second point of the series connected storage elements, said superconductive storage elements and said superconductive device being constructed of thin films on a substrate which supports a thin superconductive ground plane, said second terminal being connected to said superconductive ground plane, the normal characteristic impedance of the first and second superconductive devices being equal to the characteristic series connected storage elements.

7. In a storage matrix of a computer, the combination comprising: an electric circuit including a plurality of superconductive storage elements connected in series between a first point and a second point, a first superconductive device connected between a first terminal and a second terminal, means for applying a first input signal to said first superconductive device, said first input signal acting to switch said first device in a bistable manner between a condition of zero impedance and a condition of normal characteristic impedance, a second superconductive device connected between a third terminal and a fourth terminal, means for applying a second input signal to said second superconductive device, said second input signal acting to switch said second device in a bistable manner between a condition of zero impedance and a condition of normal characteristic impedance, said first terminal being connected to said first point, [said second terminal and] said third terminal being connected to said second point, and said fourth terminal being connected to said second terminal, said superconductive storage elements and said superconductive device being constructed of thin films on a substrate which supports a thin superconductive ground plane, said second terminal being connected to said superconductive ground plane, a read circuit connected across said first and second terminals, a write circuit connected across said third and fourth terminals, the first superconductive device being normally conducting and the second superconductive device being superconducting thereby short-circuiting the output of the write circuit during reading of the information stored in the storage elements, the first superconductive device being superconducting thereby short-circuiting the input of the read circuit and the second superconductive device being normally conducting during the writing of information in the storage device.

8. The combination of claim 7, wherein the normal characteristic impedance of the first and the second super-conductive devices is equal to the characteristic impedance of the line formed by the plurality of series connected elements.

9. An electric circuit including a plurality of superconductive storage elements connected in series between a first point and a second point, a superconductive device connected between a first terminal and a second terminal, means for applying a first input signal to said device, said first input signal acting to switch said device in a bistable manner between a condition of zero impedance and a condition of normal characteristic impedance, said first terminal being connected to said first point of the series connected superconductive storage elements and said second terminal being connected to said second point of the series connected storage elements, said superconductive storage elements and said superconductive device being constructed of thin films on a substrate which supports a thin superconductive ground plane, said second terminal being connected to said superconductive ground plane, each storage element comprising a pair of parallel superconductive paths, means for applying a second input signal to each storage element, one of said paths being switched from the superconducting to the normally conducting state in response to said second input signal, information being stored in each storage element by setting up a persistent current to circulate around the loop formed by said pair of superconductive parallel paths.

10. A circuit as recited in claim 9, wherein each path of each pair of superconductive parallel paths is composed of a different material, and the second input signal is applied to a superconductive conductor which is electrically isolated from the traverses a respective pair of parallel paths.

11. An electric circuit including a plurality of superconductive storage elements connected in series between a first point and a second point, a first superconductive device connected between a first terminal and a second terminal, means for applying a first input signal to said first superconductive device, said first input signal acting to switch said first device in a bistable manner between a condition of zero impedance and a condition of normal characteristic impedance, a second superconductive device connected between a third terminal and a fourth terminal, means for applying a second input signal to said second superconductive device, said second input signal acting to switch said second device in a bistable manner between a condition of zero impedance and a condition of normal characteristic impedance, said first terminal being connected to said first point, [said second terminal and] said third terminal being connected to said second point, and said fourth terminal being connected to said second terminal, said superconductive storage elements, and said superconductive device being constructed of thin films on a substrate which supports a thin superconductive ground plane, said second terminal being connected to said superconductive ground plane, each storage element comprising a pair of parallel superconductive paths, means for applying a third input signal to each storage element, one of said paths being switched from the superconducting to the normally conducting state in response to said third input signal, information being stored in each storage element by setting up a persistent current to circulate around the loop formed by said pair of superconductive parallel paths.

12. A circuit as recited in claim 11, wherein each path of each pair of superconductive parallel paths is composed of a different material, and the third input signal is applied to a supeconductive conductor which is electrically isolated from and traverses a respective pair of parallel paths.

13. An electric circuit including a plurality of superconductive storage element connected in series between a first point and a second point, a first in line cryotron connected between a first terminal and a second terminal, means for applying a first input signal to said first in line cryotron, said first input signal acting to switch said first device in a bistable manner between a condition of zero impedance and a condition of normal characteristic impedance, a second in line cryotron connected between a third terminal and a fourth terminal, means for applying a second input signal to said second in line cryotron, said second input signal acting to switch said second cryotron in a bistable manner between a condition of zero impedance and a condition of normal characteristic impedance, said first terminal being connected to said first point, [said second terminal and] said third terminal being connected to said second point, and said fourth terminal being connected to said second terminal, said superconductive storage elements and said in line cryotrons being constructed of thin films on a substrate which supports a thin superconductive ground plane, said second terminal being connected to said superconductive ground plane.

14. In a storage matrix of a computer, the combination comprising: an electric circuit including a plurality of superconductive storage elements connected in series between a first point and a second point, a first superconductive device connected between a first terminal and a second terminal, means for applying a first input signal to said first superconductive device, said first input signal acting to switch said first device in a bistable manner between a condition of zero impedance and a condition of normal characteristic impedance, a second superconductive device connected between a third terminal and a fourth terminal, means for applying a second input signal to said second superconductive device, said second input signal acting to switch said second device in a bistable manner between a condition of zero impedance and a condition of normal characteristic impedance, said first terminal being connected to said first point, [said second terminal and] said third terminal being connected to said second point, and said fourth terminal being connected to said *second* terminal, said superconductive storage elements and said superconductive device being constructed of thin films on a substrate which supports a thin superconductive ground plane, said second terminal being connected to said superconductive ground plane, each storage element comprising a pair of parallel superconductive paths, means for applying a third input signal acting to switch one of said paths from the superconducting to the normally conducting state, information being stored in a storage element by setting up a persistent current to circulate around the loop formed by said pair of superconductive parallel paths, a read circuit connected across said first and second terminals, a write circuit connected across said third and fourth terminals, the first superconductive device being normally conducting and the second superconductive device being superconducting thereby short-circuiting the output of the write circuit during reading of the information stored in the storage elements, the first superconductive device being superconducting thereby short-circuiting the input of the read circuit and the second superconductive device being normally conducting during the writing of information in the storage device.

15. A storage matrix as defined in claim 14, wherein the normal characteristic impedance of the first and the second superconductive devices is equal to the characteristic impedance of the line formed by the plurality of series connected elements.

16. An electric circuit including a plurality of superconductive storage elements connected in series between a first point and a second point, a first crossed film cryotron with multiple crossings connected between a first terminal and a second terminal, means for applying a first input signal to said first crossed film cryotron, said first input signal acting to switch said first device in a bistable manner between a condition of zero impedance and a condition of normal characteristic impedance, a second cross film cryotron with multiple crossings connected between a third terminal and a fourth terminal, means for applying a second input signal to said second crossed film cryotron, said second input signal acting to switch said second crossed film cryotron in a bistable manner between a condition of zero impedance and a condition of normal characteristic impedance, said first terminal being connected to said first point, [said second terminal and] said third terminal being connected to said second point, and said fourth terminal being connected to said second terminal, said superconductive storage elements and said crossed film cryotrons being constructed of thin films on a substrate which supports a thin superconductive ground plane, said second terminal being connected to said superconductive ground plane.

References Cited

The following references, cited by the Examiner, are of record in the patented file of this patent or the original patent.

UNITED STATES PATENTS 3,135,946 6/1964 Miller ---------- 340—173.1

TERRELL W. FEARS, Primary Examiner

U.S. Cl. X.R.

307—238